United States Patent [19]
Shalati et al.

[11] Patent Number: 5,516,846
[45] Date of Patent: * May 14, 1996

[54] REACTIVE COATINGS COMPRISING AN ACID-FUNCTIONAL COMPONENT, AN ANHYDRIDE-FUNCTIONAL COMPONENT AND A MONOEPOXY FUNCTIONAL COMPOUND

[75] Inventors: Mohamad D. Shalati, Richton Park; James A. Marquart, Chicago Heights; John L. Petty, Homewood; Rodney M. Harris, Chicago, all of Ill.

[73] Assignee: The Sherwin-Williams Company, Cleveland, Ohio

[*] Notice: The portion of the term of this patent subsequent to Oct. 3, 2006, has been disclaimed.

[21] Appl. No.: 519,854

[22] Filed: Aug. 25, 1995

Related U.S. Application Data

[63] Continuation of Ser. No. 763,050, Sep. 20, 1991, abandoned, which is a continuation of Ser. No. 120,893, Nov. 16, 1987, abandoned.

[51] Int. Cl.⁶ .................... C08L 35/02; C08L 33/02; C08L 67/00
[52] U.S. Cl. .................... 525/207; 525/108; 525/111; 525/112; 525/113; 525/114; 525/119; 525/166; 525/168; 525/170; 525/172; 525/173; 525/174; 525/176; 525/194; 525/221; 525/327.4; 525/327.7; 525/437; 525/438; 525/439; 525/444; 525/445; 525/447; 525/448; 525/186
[58] Field of Search ................... 525/111, 112, 525/108, 113, 114, 119, 166, 168, 170, 172, 173, 174, 176, 194, 207, 221, 327.4, 327.7, 437, 438, 439, 444, 445, 447, 448, 186

[56] References Cited

U.S. PATENT DOCUMENTS

| | | | |
|---|---|---|---|
| 4,216,306 | 8/1980 | Broeckeler | 523/458 |
| 4,316,835 | 2/1982 | Gardner | 523/512 |
| 4,398,013 | 8/1983 | Johnson | 525/340 |
| 4,507,412 | 3/1985 | Hickner et al. | 523/455 |
| 4,664,983 | 5/1987 | Nakamura et al. | 523/440 |
| 4,703,101 | 10/1987 | Singer et al. | 525/438 |
| 4,798,745 | 1/1989 | Martz et al. | 525/207 |
| 4,871,806 | 10/1989 | Shalati et al. | 525/108 |

FOREIGN PATENT DOCUMENTS 0134691  3/1985  European Pat. Off..

*Primary Examiner*—Robert E. Sellers
*Attorney, Agent, or Firm*—Robert E. McDonald

[57] ABSTRACT

Coating compositions which comprise:
- (i) an acid-functional compound having an average of at least two carboxylic acid groups per molecule; and
- (ii) an anhydride-functional compound having an average of at least two cyclic carboxylic acid anhydride groups per molecule; and
- (iii) an epoxy-functional compound having an average of at least one epoxy group per molecule; wherein at least one of the compounds (i), (ii), or (iii) comprises a film forming polymer.

27 Claims, No Drawings

REACTIVE COATINGS COMPRISING AN ACID-FUNCTIONAL COMPONENT, AN ANHYDRIDE-FUNCTIONAL COMPONENT AND A MONOEPOXY FUNCTIONAL COMPOUND

This is a continuation of application Ser. No. 07/763,050 filed on Sep. 20, 1991 now abandoned, which is a continuation of application Ser. No. 07/120,893 filed on Nov. 16, 1987, now abandoned.

BACKGROUND OF THE INVENTION

1. Field of the Invention

This invention relates to novel reactive coatings which can be cured at room temperature or force dried at temperatures ranging up to about 350° F. The coatings may be utilized as primers, topcoats or as clearcoats and/or basecoats in clearcoat/basecoat compositions. The combination of acid-functional components, anhydride-functional components, and epoxy-functional components, especially cycloaliphatic epoxy components, provides fast reacting, durable coatings which minimize the toxicity problems which may be associated with other low temperature curing systems.

2. Description of the Prior Art

Many prior art approaches to high performance low temperature curing coatings have involved two component coatings comprising reactive polyisocyanates and active hydrogen-containing compounds such as hydroxyl-containing polymers or amine-containing polymers to produce polyurethane or polyurea coatings. Although these materials have excellent performance and cure at low temperatures, the isocyanates may, under some conditions, be relatively hazardous to handle.

Coating compositions comprising reactive combinations of epoxy-containing components and components having acid or amine functionality are known in the art. Similarly, coating compositions comprising cyclic anhydrides and epoxy-functional components are also known in the art. The prior art has not, however, taught the combination of anhydride-functional components, acid-functional components, and epoxy-functional components to provide low temperature curing coatings having excellent durability and performance.

BRIEF SUMMARY OF THE INVENTION

This invention involves a curable composition which comprises: (i) an acid-functional component having an average of at least two carboxylic acid groups per molecule; and (ii) an anhydride-functional component having an average of at least two cyclic carboxylic acid anhydride groups per molecule; and (iii) an epoxy-functional component having an average of at least one and, preferably, at least two epoxy groups per molecule; wherein at least one of the components (i), (ii) or (iii) comprises a film forming polymer. The term "component" is used in its broadest sense to include monomers, oligomers and polymers. The term "film forming polymer" means any polymeric material that can form a film from evaporation of any carrier or solvent.

In its more preferred formulation, this invention relates to curable compositions wherein the acid-functional component is a polymer obtained by the half-ester reaction of a hydroxy-functional polymer with a cyclic carboxylic acid anhydride, and wherein the anhydride-functional component is the addition polymerization product of at least one unsaturated monomer having anhydride functionality and at least one other ethylenically unsaturated monomer, and wherein the epoxy-functional component is a cycloaliphatic epoxy component.

It is especially preferred to utilize the curable compositions of this invention in combination with about 5 to about 80%, and especially 5 to about 50%, by weight of an inert solvent, such as esters, ketones, aromatic and aliphatic hydrocarbons, etc. It is convenient to provide the coating composition as a multicomponent system which is reactive upon mixing the components. Especially preferred is a two-package system wherein the anhydride-functional component and the acid-functional component are combined in one package and the epoxy-functional component provides a second package. The two packages can then be mixed together to provide the curable coatings immediately prior to application.

In one preferred application, this invention relates to coated substrates having a multi-layer decorative and/or protective coating which comprises:

(a) a basecoat comprising a pigmented film-forming polymer; and (b) a transparent clearcoat comprising a film-forming polymer applied to the surface of the basecoat composition;

wherein the clearcoat and/or the basecoat comprises the curable compositions of this invention.

Accordingly, it is an object of this invention to provide improved curable compositions having excellent reactivity at low temperatures. It is a further object of this invention to provide coating compositions which, may be utilized as primers, topcoats or clearcoats and/or basecoats in clearcoat/basecoat compositions. Another object of this invention is to provide an improved two-package coating composition wherein one package comprises an anhydride-functional component and an acid-functional component and the other package comprises a epoxy-functional component. Another object of this invention is to provide coatings having excellent exterior durability and corrosion resistance. A further object of this invention is to provide improved coating compositions which can be cured at room temperature or force dried at elevated temperatures. These and other objects of the invention will become apparent from the following discussions.

DETAILED DESCRIPTION OF THE INVENTION

1. ACID-FUNCTIONAL COMPONENTS

The acid-functional components which are useful in the practice of this invention should have an average of at least two, and preferably at least three, carboxylic acid groups per molecule. Although low molecular weight diacids and polyacids such as phthalic acid, succinic acid, adipic acid, azelaic acid, maleic acid, fumaric acid, trimellitic acid and trimesic acid can be utilized in the practice of this invention, it is especially preferred to utilize polymeric acid-functional components.

Preferably the acid-functional polymer will have a number average molecular weight of at least about 400 and most preferably at least 1,000. Typical number average molecular weights of the carboxylic acid-functional polymers will range from about 1,000 to about 30,000. Representative acid-functional polymers include acrylics, polyesters and polymers prepared by the reaction of anhydrides with hydroxy-functional polymers as discussed more fully below.

1.A. Carboxylic acid-functional polymers prepared by the half-ester forming reaction of anhydrides and hydroxy-functional polymers.

Especially preferred in the practice of this invention are carboxylic acid-functional polymers prepared by the half-ester reaction of cyclic carboxylic acid anhydrides and hydroxy-functional polymers. The half-ester reaction involves the ring opening of the cyclic anhydride by reaction with a hydroxyl group on the hydroxy-functional polymer to form one ester group and one acid group.

Typically, the hydroxy-functional polymers will have number average molecular weights of at least about 400, preferably at least 1,000, and typical number average molecular weights will range from about 400 to about 30,000, and especially 1,000 to about 15,000. Methods of preparing hydroxy-functional polymers are well known in the art and the method of preparation of the hydroxy-functional molecule or polymer is not critical to the practice of this invention. Representative polymers which can be reacted with anhydrides to produce the acid-functional polymers include the hydroxy-functional polyether, polyesters, acrylics, polyurethanes, polycaprolactones, etc. as generally discussed in Sections 1.A.1. through 1.A.5. below.

1.A.1. Polyether polyols are well known in the art and are conveniently prepared by the reaction of a diol or polyol with the corresponding alkylene oxide. These materials are commercially available and may be prepared by a known process such as, for example, the processes described in *Encyclopedia of Chemical Technology*, Volume 7, pages 257–262, published by Interscience Publishers, Inc., 1951. Representative examples include the polypropylene ether glycols and polyethylene ether glycols such as those marketed as Niax® Polyols from Union Carbide Corporation.

1.A.2. Another useful class of hydroxy-functional polymers are those prepared by condensation polymerization reaction techniques as are well known in the art. Representative condensation polymerization reactions include polyesters prepared by the condensation of polyhydric alcohols and polycarboxylic acids or anhydrides, with or without the inclusion of drying oil, semi-drying oil, or non-drying oil fatty acids. By adjusting the stoichiometry of the alcohols and the acids while maintaining an excess of hydroxyl groups, hydroxy-functional polyesters can be readily produced to provide a wide range of desired molecular weights and performance characteristics.

The polyester polyols are derived from one or more aromatic and/or aliphatic polycarboxylic acids, the anhydrides thereof, and one or more aliphatic and/or aromatic polyols. The carboxylic acids include the saturated and unsaturated polycarboxylic acids and the derivatives thereof, such as maleic acid, fumaric acid, succinic acid, adipic acid, azelaic acid, and dicyclopentadiene dicarboxylic acid. The carboxylic acids also include the aromatic polycarboxylic acids, such as phthalic acid, isophthalic acid, terephthalic acid, etc. Anhydrides such as maleic anhydride, phthalic anhydride, trimellitic anhydride, or Nadic Methyl Anhydride (brand name for methylbicyclo[2.2.1]heptene-2,3-dicarboxylic anhydride isomers) can also be used.

Representative saturated and unsaturated polyols which can be reacted with the carboxylic acids to produce hydroxy-functional polyesters include diols such as ethylene glycol, dipropylene glycol, 2,2,4-trimethyl 1,3-pentanediol, neopentyl glycol, 1,2-propanediol, 1,4-butanediol, 1,3-butanediol, 2,3-butanediol, 1,5-pentanediol, 1,6-hexanediol, 2,2-dimethyl-1,3-propanediol, 1,4-cyclohexanedimethanol, 1,2-cyclohexanedimethanol, 1,3-cyclohexanedimethanol, 1,4-bis(2-hydroxyethoxy)cyclohexane, trimethylene glycol, tetramethylene glycol, pentamethylene glycol, hexamethylene glycol, decamethylene glycol, diethylene glycol, triethylene glycol, tetraethylene glycol, norbornylene glycol, 1,4-benzenedimethanol, 1,4-benzenediethanol, 2,4-dimethyl-2-ethylenehexane-1,3-diol, 2-butene-1,4-diol, and polyols such as trimethylolethane, trimethylolpropane, trimethylolhexane, triethylolpropane, 1,2,4-butanetriol, glycerol, pentaerythritol, dipentaerythritol, etc.

Typically, the reaction between the polyols and the polycarboxylic acids is conducted at about 120° C. to about 200° C. in the presence of an esterification catalyst such as dibutyl tin oxide.

1.A.3. Additionally, hydroxy-functional polymers can be prepared by the ring opening reaction of epoxides and/or polyepoxides with primary or, preferably, secondary amines or polyamines to produce hydroxy-functional polymers. Representative amines and polyamines include ethanol amine, N-methylethanol amine, dimethyl amine, ethylene diamine, isophorone diamine, etc. Representative polyepoxides include those prepared by condensing a polyhydric alcohol or polyhydric phenol with an epihalohydrin, such as epichlorohydrin, usually under alkaline conditions. Some of these condensation products are available commercially under the designations EPON or DRH from Shell Chemical Company, and methods of preparation are representatively taught in U.S. Pat. Nos. 2,592,560; 2,582,985 and 2,694,694.

1.A.4. Other useful hydroxy-functional polymers can be prepared by the reaction of an excess of at least one polyol, such as those representatively described in Section 1.A.2 above, with polyisocyanates to produce hydroxy-functional urethanes. The polyols should, of course, be present at a level to provide an excess of hydroxyl groups over isocyanate groups. Representative polyisocyanates having two or more isocyanate groups per molecule include the aliphatic compounds such as ethylene, trimethylene, tetramethylene, pentamethylene, hexamethylene, 1,2-propylene, 1,2-butylene, 2,3-butylene, 1,3-butylene, ethylidene and butylidene diisocyanates; the cycloalkylene compounds such as 3-isocyanatomethyl-3,5,5-trimethylcyclohexylisocyanate, and the 1,3-cyclopentane, 1,3-cyclohexane, and 1,2-cyclohexane diisocyanates; the aromatic compounds such as m-phenylene, p-phenylene, 4,4'-diphenyl, 1,5-naphthalene and 1,4-naphthalene diisocyanates; the aliphatic-aromatic compounds such as 4,4'-diphenylene methane, 2,4- or 2,6-toluene, or mixtures thereof, 4,4'-toluidine, and 1,4-xylylene diisocyanates; the nuclear substituted aromatic compounds such as dianisidine diisocyanate, 4,4'-diphenylether diisocyanate and chlorodiphenylene diisocyanate; the triisocyanates such as triphenyl methane-4,4',4"-triisocyanate, 1,3,5-triisocyanate benzene and 2,4,6-triisocyanate toluene; and the tetraisocyanates such as 4,4'-diphenyl-dimethyl methane-2, 2'-5,5'-tetraisocyanate; the polymerized polyisocyanates such as tolylene diisocyanate dimers and trimers, and other various polyisocyanates containing biuret, urethane, and/or allophanate linkages. The polyisocyanates and the polyols are typically reacted at temperatures of 25° C. to about 150° C. to form the hydroxy-functional polymers.

1.A.5. Useful hydroxy-functional polymers can also be conveniently prepared by free radical polymerization techniques such as in the production of acrylic resins. The polymers are typically prepared by the addition polymerization of one or more monomers. At least one of the monomers will contain, or can be reacted to produce, a reactive hydroxyl group. Representative hydroxy-functional monomers include 2-hydroxyethyl acrylate, 2-hydroxypropyl acrylate, 4-hydroxybutyl methacrylate, 2-hydroxypropyl methacrylate, 3-hydroxybutyl acrylate, 4-hydroxypentyl acrylate, 2-hydroxyethyl ethacrylate, 3-hydroxybutyl methacrylate, 2-hydroxyethyl chloroacrylate, diethylene glycol methacrylate, tetraethylene glycol acrylate, para-vinyl benzyl alcohol, etc. Typically the hydroxy-functional monomers would be copolymerized with one or more monomers having ethylenic unsaturation such as:

(i) esters of acrylic, methacrylic, crotonic, tiglic, or other unsaturated acids such as: methyl acrylate, ethyl acrylate, propyl acrylate, isopropyl acrylate, butyl acrylate, isobutyl acrylate, ethylhexyl acrylate, amyl acrylate, 3,5,5-trimethylhexyl acrylate, methyl methacrylate, ethyl methacrylate, propyl methacrylate, isobornyl methacrylate, dimethylaminoethyl methacrylate, ethyl tiglate, methyl crotonate, ethyl crotonate, etc.;

(ii) vinyl compounds such as vinyl acetate, vinyl propionate, vinyl butyrate, vinyl isobutyrate, vinyl benzoate, vinyl m-chlorobenzoate, vinyl p-methoxybenzoate, vinyl alpha-chloroacetate, vinyl toluene, vinyl chloride, etc.;

(iii) styrene-based materials such as styrene, alpha-methyl styrene, alpha-ethyl styrene, alpha-bromo styrene, 2,6-dichlorostyrene, etc.;

(iv) allyl compounds such as allyl chloride, allyl acetate, allyl benzoate, allyl methacrylate, etc.;

(v) other copolymerizable unsaturated monomers such as acrylonitrile, methacrylonitrile, dimethyl maleate, isopropenyl acetate, isopropenyl isobutyrate, acrylamide, methacrylamide, and dienes such as 1,3-butadiene, etc.

The polymers are conveniently prepared by conventional free radical addition polymerization techniques. Frequently, the polymerization will be initiated by conventional initiators known in the art to generate a free radical such as azobis(isobutyronitrile), cumene hydroperoxide, t-butyl perbenzoate, etc. Typically, the monomers are heated in the presence of the initiator at temperatures ranging from about 35° C. to about 200° C. and especially 75° C. to 150° C., to effect the polymerization. The molecular weight of the polymer can be controlled, if desired, by the monomer selection, reaction temperature and time, and/or the use of chain transfer agents as is well known in the art.

Especially preferred polymers in the practice of this invention for reaction with the cyclic anhydride to produce the carboxylic acid-functional polymers are hydroxy-functional polyesters and hydroxy-functional free radical addition polymers. An especially preferred hydroxy-functional polymer is the addition polymerization reaction product of (a) 10 to about 40 weight percent of a hydroxy-functional ethylenically unsaturated monomer and (b) 60 to about 90 weight percent of at least one ethylenically unsaturated monomer copolymerizable with the hydroxy-functional monomer.

The cyclic carboxylic acid anhydrides useful in the practice of this invention to produce the carboxylic acid-functional half-ester product by reaction with the hydroxy-functional component can be any monomeric aliphatic or aromatic cyclic anhydride having one anhydride group per molecule. Representative anhydrides include, phthalic anhydride, 3-nitrophthalic anhydride, 4-nitrophthalic anhydride, 3-flourophthalic anhydride, 4-chlorophthalic anhydride, tetrachlorophthalic anhydride, tetrabromophthalic anhydride, tetrahydrophthalic anhydride, hexahydrophthalic anhydride, methylhexahydrophthalic anhydride, succinic anhydride, dodecenylsuccinic anhydride, octylsuccinic anhydride, maleic anhydride, dichloromaleic anhydride, glutaric anhydride, adipic anhydride, chlorendic anhydride, itaconic anhydride, citraconic anhydride, endomethylenetetrahydrophthalic anhydride, cyclohexane-1,2-dicarboxylic anhydride, 4-cyclohexene-1,2-dicarboxylic anhydride, 4-methyl-4-cyclohexene-1,2-dicarboxylic anhydride, 5-norbornene-2,3-dicarboxylic anhydride, 1,4-cyclohexadiene-1,2-dicarboxylic anhydride, 1,3-cyclopentanedicarboxylic anhydride, diglycolic acid anhydride, etc. Maleic anhydride is especially preferred because of its reactivity and relatively low cost. Other useful anhydrides include those anhydrides having a free carboxyl group in addition to the anhydride group such as trimellitic anhydride, aconitic anhydride, 2,6,7-naphthalene tricarboxylic anhydride, 1,2,4-butane tricarboxylic anhydride, 1,3,4-cyclopentane tricarboxylic anhydride, etc.

The reaction of the hydroxy-functional component and the cyclic anhydride should normally be conducted at temperatures less than about 75° C., preferably less than 65° C., and most preferably between about 35° C. to 60° C. The reaction temperature is maintained until the reaction has proceeded to provide the desired amount of half-ester groups on the acid-functional component. Normally, as a convenient measure of the extent of the reaction, the reaction will be continued until no change in the amount of residual unreacted anhydride can be observed, and will generally involve reacting at least about 70%, and preferably at least 95%, of the available anhydride. If the subsequent end use of the acid-functional polymer can tolerate the remaining free anhydride, if any, no separation or removal of the excess unreacted anhydride is necessary. If the end use of the acid-functional polymer requires that it be free of any unreacted anhydride, the reaction can be continued until substantially all of the anhydride has reacted, or the free anhydride may be removed by vacuum distillation or other technique well known in the art.

The level of anhydride reacted with the hydroxy-functional compound need only be sufficient to provide the final desired acid value of the acid functional component. Typically the reaction would be conducted by admixing the polyol and the anhydride at levels to provide at least about 0.3 and normally about 0.7 to 1.0 anhydride groups for each hydroxyl group. By conducting the reaction at temperatures less than about 75° C. the carboxylic acid groups formed as part of the half-ester are not appreciably reactive with the hydroxyl groups themselves and so they do not compete with the ring opening half-ester reaction of the remaining anhydrides.

In order to conduct the reaction at these relatively low temperatures, it is preferred to utilize an esterification catalyst. The catalyst should be present in sufficient amount to catalyze the reaction and typically will be present at a level of at least about 0.01%, and normally from about 0.05% to about 3.0%, based upon the weight of the cyclic anhydride. Catalysts which are useful in the esterification reaction of the anhydride with the hydroxy-functional molecule include mineral acids such as hydrochloric acid and sulfuric acid; alkali metal hydroxides such as sodium hydroxide; tin compounds such as stannous octoate, or dibutyltin oxide; aliphatic or aromatic amines, especially tertiary alkyl amines, such as triethylamine; and aromatic heterocyclic amines such as N-methyl imidazole and the like. Especially preferred are N-methyl imidazole and triethylamine.

Although the reaction between the hydroxy-functional component and the anhydride can be conducted in the absence of solvent if the materials are liquid at the reaction temperature, it is normally preferred to conduct the reaction in the presence of an inert solvent such as esters, ketones, ethers or aromatic hydrocarbons. If desired, the acid-functional component can be utilized as the solvent solution, or, optionally, all or part of the inert solvent may be removed, e.g. by distillation, after the reaction is completed.

After the reaction completed it is frequently desirable to add a low molecular weight alcohol solvent, such as isobutanol or isopropanol, to the acid-functional polymer at a level of about 5 to 35% by weight to provide stabilization on storage.

1.B. Carboxylic Acid-Functional Polymers Prepared From Unsaturated Acid-Functional Monomers.

Useful acid-functional polymers can also be conveniently prepared by addition polymerization techniques such as in the production of acrylic resins. The acid-functional polymers are routinely prepared by the free radical addition polymerization of unsaturated acids such as maleic acid, acrylic acid, methacrylic acid, crotonic acid, etc. along with one or more unsaturated monomers. Representative monomers include the esters of unsaturated acids, vinyl compounds, styrene-based materials, allyl compounds and other copolymerizable monomers as representatively taught in Section 1.A.5. of this specification. The monomers which are co-polymerized with the unsaturated acid should be free of any functionality which could react with the acid groups during the polymerization.

1.C. Carboxylic Acid-Functional Polymers Prepared From Polyols and Polyacids.

Other useful acid-functional polymers include polyester polymers obtained from the reaction of one or more aromatic and/or aliphatic carboxylic acids or their anhydrides and one or more aliphatic and/or aromatic polyols wherein the acid functionality is present at a level to provide an excess of acid groups over hydroxyl groups. Representative carboxylic acids and polyols include those listed in Section 1.A.2. of this specification.

2. ANHYDRIDE-FUNCTIONAL COMPONENTS

The anhydride-functional components which are useful in the practice of this invention can be any aliphatic or aromatic compound having at least two cyclic carboxylic acid anhydride groups in the molecule. Polymeric anhydrides having number average molecular weights between 500 and 7,000 are most useful. Especially preferred in the practice of this invention is the use of free radical addition polymers, such as acrylic polymers having anhydride functionality. These are conveniently prepared as is well known in the art by the polymerization under free radical addition polymerization conditions of at least one unsaturated monomer having anhydride functionality, such as maleic anhydride, citraconic anhydride, itaconic anhydride, propenyl succinic anhydride, etc. with other ethylenically unsaturated monomers such as the esters of unsaturated acids, vinyl compounds, styrene-based materials, allyl compounds and other copolymerizable monomers, all as representatively taught in Section 1.A.5. of this specification. The monomers which are copolymerized with the unsaturated anhydride should, of course, be free of any functionality which could react with the anhydride group during the polymerization. The anhydride-functional polymers can be conveniently prepared by conventional free radical addition polymerization techniques. Typically the polymerization will be conducted in an inert solvent and in the presence of a catalyst at temperatures ranging from 35° C. to about 200° C. An especially preferred anhydride-functional polymer comprises the free radical addition polymerization product of (a) 5 to 40, and especially 15 to about 25, weight percent of an ethylenically unsaturated monoanhydride and (b) 60 to 95, and especially 75 to about 85, weight percent of at least one other ethylenically unsaturated monomer copolymerizable with the ethylenically unsaturated anhydride.

Other polyanhydrides, in addition to the polymeric anhydrides prepared by a free radical addition process, can also be utilized in the practice of this invention. Ester anhydrides can be prepared, as is known in the art, by the reaction of e.g. trimellitic anhydride with polyols. Other representative, suitable polyanhydrides include poly-functional cyclic dianhydrides such as cyclopentane tetracarboxylic acid dianhydride, diphenyl-ether tetracarboxylic acid dianhydride, 1,2, 3,4,-butane tetracarboxylic acid dianhydride, and the benzophenone tetracarboxylic dianhydrides such as 3,3',4, 4'-benzophenone tetracarboxylic dianhydride, and 2,bromo-3,3',4,4'-benzophenone tetracarboxylic acid dianhydride. Trianhydrides such as the benzene and cyclohexene hexacarboxylic acid trianhydrides are also useful.

Additionally, useful polyanhydrides can be prepared by the maleinization of polyunsaturated compounds such as unsaturated rubbers, unsaturated oils and unsaturated hydrocarbons.

3. EPOXY-FUNCTIONAL COMPONENTS

The coatings of this invention also require the use of at least one epoxy-functional component. The epoxy components can be monoepoxies or, preferably, a polyepoxide having an average of at least two epoxy groups per molecule.

Representative useful monoepoxies include the monoglycidyl ethers of aliphatic or aromatic alcohols such as butyl glycidyl ether, octyl glycidyl ether, nonyl glycidyl ether, decyl glycidyl ether, dodecyl glycidyl ether, p-tert-butylphenyl glycidyl ether, and o-cresyl glycidyl ether. Monoepoxy esters such as the glycidyl ester of versatic acid (commercially available as CARDURA® E from Shell Chemical Company), or the glycidyl esters of other acids such as tertiary-nonanoic acid, tertiary-decanoic acid, tertiary-undecanoic acid, etc. are also useful. Similarly, if desired, unsaturated monoepoxy esters such as glycidyl acrylate, glycidyl methacrylate or glycidyl laurate could be used. Additionally, monoepoxidized oils can also be used.

Other useful monoepoxies include styrene oxide, cyclohexene oxide, 1,2-butene oxide, 2,3-butene oxide, 1,2-pentene oxide, 1,2-heptene oxide, 1,2-octene oxide, 1,2-nonene oxide, 1,2-decene oxide, and the like.

It is only necessary that the monoepoxide components have a sufficiently low volatility to remain in the coating composition under the applicable conditions of cure.

Polyepoxides are especially preferred in this reaction. Especially preferred as the poly-functional epoxy components, due to their reactivity and durability, are the polyepoxy-functional cycloaliphatic epoxies. Preferably, the cycloaliphatic epoxies will have a number average molecular weight less than about 2,000 to minimize the viscosity. The cycloaliphatic epoxies are conveniently prepared by methods well known in the art such as epoxidation of dienes or polyenes, or the epoxidation of unsaturated esters by reaction with a peracid such as peracetic and/or performic acid.

Commercial examples of representative preferred cycloaliphatic epoxies include 3,4-epoxycyclohexylmethyl 3,4-epoxycyclohexane carboxylate (e.g. "ERL-4221" from Union Carbide Corp.); bis(3,4-epoxycyclohexylmethyl)adipate (e.g. "ERL-4299" from Union Carbide Corporation); 3,4-epoxy-6-methylcyclohexylmethyl 3,4-epoxy-6-methylcyclohexane carboxylate (e.g. "ERL-4201" from Union Carbide Corp.); bis(3,4-epoxy-6-methylcyclohexylmethyl)adipate (e.g. "ERL-4289" from Union Carbide Corp.); bis(2, 3-epoxycyclopentyl) ether (e.g. "ERL-0400" from Union Carbide Corp.); dipentene dioxide (e.g. "ERL-4269" from Union Carbide Corp.); 2-(3,4-epoxycyclohexyl-5, 5-spiro-3,4-epoxy) cyclohexane-metadioxane (e.g. "ERL-4234" from Union Carbide Corp.). Other commercially available cycloaliphatic epoxies are available from Ciba-Geigy Corporation such as CY 192, a cycloaliphatic diglycidyl ester epoxy resin having an epoxy equivalent weight of about 154. The manufacture of representative cycloaliphatic epoxies is taught in various patents including U.S. Pat. Nos. 2,884,408, 3,027,357 and 3,247,144.

Other polyepoxides potentially useful in the practices of this invention include aliphatic and aromatic polyepoxies, such as those prepared by the reaction of an aliphatic polyol or polyhydric phenol and an epihalohydrin. Other useful epoxies include epoxidized oils and acrylic polymers derived from ethylenically unsaturated epoxy-functional monomers such as glycidyl acrylate or glycidyl methacrylate in combination with other copolymerizable monomers such as those listed in 1.A.5 above. It is often desirable to utilize epoxy-functional components which are free of hydroxyl groups.

The ratios of anhydride to acid to epoxy groups can be widely varied within the practice of this invention. It is especially preferred, however, to provide about 0.3 to about 6.0 acid groups and about 0.6 to about 12.0 epoxy groups for each anhydride group in the reactive system. It is especially preferred to provide 2.0 to about 5.0 acid groups and 3.0 to about 8.0 epoxy groups for each anhydride group. At least one of the acid-functional components, the epoxy-functional components, or the anhydride-functional components should be a film forming polymer, and each of the components should be mutually soluble with the other components.

The coatings of this invention can be cured at temperatures ranging from about room temperature up to about 350° F. The coatings can be used as clear coatings or they may contain pigments as is well known in the art. Representative opacifying pigments include white pigments such as titanium dioxide, zinc oxide, antimony oxide, etc. and organic or inorganic chromatic pigments such as iron oxide, carbon black, phthalocyanine blue, etc. The coatings may also contain extender pigments such as calcium carbonate, clay, silica, talc, etc.

The coatings may also contain other additives such as flow agents, catalysts, diluents, solvents, ultraviolet light absorbers, etc.

Although it is not our intent to be bound by theory, it is believed that in the course of the curing reaction of the components of this invention, that at least some of the acid groups and epoxy groups react to produce ester groups and hydroxyl groups and that at least some of these hydroxyl groups are reacted with the anhydride groups to produce ester groups and additional acid groups. It is, therefore, especially preferred in the practice of this invention to include a catalyst for the reaction of anhydride groups and hydroxyl groups and also a catalyst for the reaction of epoxy and acid groups. It is especially preferred in the practice of this invention to utilize tertiary amines and especially N-methylimidazole as a catalyst for the anhydride/hydroxyl reaction. The catalyst for the anhydride/hydroxyl reaction will typically be present at a level of at least 0.01% by weight of the anhydride component and preferably 1.0 to about 5.0%.

Tertiary amines, secondary amines such as ethyl imidazole, quaternary ammonium salts, and nucleophilic catalysts such as lithium iodide, phosphonium salts, and phosphines such as triphenyl phosphine are especially useful as catalysts for epoxy/acid reactions. Electrophillic catalysts, such as tin metal salts or complexes are also useful in the practice of this invention. The catalyst for the epoxy/acid reaction will typically be present at a level of at least 0.01% by weight of the total acid-functional component and epoxy-functional component and preferably will be present at 0.1 to about 3.0%.

The coatings of this invention may typically be applied to any substrate such metal, plastic, wood, glass, synthetic fibers, etc. by brushing, dipping, roll coating, flow coating, spraying or other method conventionally employed in the coating industry. If desired, the substrates may be primed prior to application of the coatings of this invention.

One preferred application of the curable coatings of this invention relates to their use as clearcoats and/or basecoats in clearcoat/basecoat formulations.

Clearcoat/basecoat systems are well known, especially in the automobile industry where it is especially useful to apply a pigmented basecoat, which may contain metallic pigments, to a substrate and allow it to form a polymer film followed by the application of a clearcoat which will not mix with or have any appreciable solvent attack upon the previously applied basecoat. The basecoat composition may be any of the polymers known to be useful in coating compositions including the reactive compositions of this invention.

One useful polymer basecoat includes the acrylic addition polymers, particularly polymers or copolymers of one or more alkyl esters of acrylic acid of methacrylic acid, optionally together with one or more other ethylenically unsaturated monomers. These polymers may be of either the thermoplastic type or the thermosetting, crosslinking type which contain hydroxyl or amine or other reactive functionality which can be crosslinked. Suitable acrylic esters for and unsaturated monomers either type of polymer include methyl methacrylate, ethyl methacrylate, propyl methacrylate, butyl methacrylate, ethyl acrylate, butyl acrylate, vinyl acetate, acrylonitrile, acrylamide, styrene, vinyl chloride, etc. Where the polymers are required to be of the crosslinking type, suitable functional monomers which can be used in addition to those already mentioned include acrylic or methacrylic acid, hydroxy ethyl acrylate, 2-hydroxy propyl methacrylate, glycidyl acrylate, tertiary-butyl amino ethyl methacrylate, etc. The basecoat composition may, in such a case, also contain a crosslinking agent such as a polyisocyanate, a polyepoxide, or a nitrogen resin such as a condensate of an aldehyde such as formaldehyde with a nitrogeneous compound such as urea, melamine or benzoguanamine or a lower alkyl ether of such a condensate. Other polymers useful in the basecoat composition include vinyl copolymers such as copolymers of vinyl esters of inorganic or organic acids, such as vinyl chloride, vinyl acetate, vinyl propionate, etc., which copolymers may optionally be partially hydrolyzed so as to introduce vinyl alcohol units.

Other polymers useful in the manufacture of the basecoat include alkyd resins or polyesters which can be prepared in a known manner by the condensation of polyhydric alcohols and polycarboxylic acids, with or without the inclusion of natural drying oil fatty acids as described elsewhere in this specification. The polyesters or alkyds may contain a proportion of free hydroxyl and/or carboxyl groups which are available for reaction, if desired with suitable crosslinking agents as discussed above.

If desired, the basecoat composition may also contain minor amounts of a cellulose ester, to alter the drying or viscosity characteristics of the basecoat.

Typically, the basecoat will include pigments conventionally used for coating compositions and after being applied to a substrate, which may or may not previously have been primed, the basecoat will be allowed sufficient time to form a polymer film which will not be lifted during the application of the clearcoat. The basecoat may be heated or merely allowed to air-dry to form the film. Generally, the basecoat will be allowed to dry for about 1 to 20 minutes before application of the clearcoat. The clearcoat is then applied to the surface of the basecoat, and the system can be allowed to dry at room temperature or, if desired, can be force dried by baking the coated substrate at temperatures typically ranging up to about 350° F.

Typically, the clearcoat may contain ultraviolet light absorbers such as hindered phenols or hindered amines at a level ranging up to about 6% by weight of the vehicle solids as is well known in the art. The clearcoat can be applied by any application method known in the art, but preferably will be spray applied. If desired, multiple layers of basecoat and/or clear-coat can be applied. Typically, both the basecoat and the clear-coat will each be applied to give a dry film thickness of about 0.01 to about 6, and especially about 0.5 to about 3.0 mils.

If desired, the novel reactive compositions taught herein could be used as a basecoat, in which case the clearcoat could also comprise the novel reactive coatings taught herein, or the polymers taught herein as being useful as basecoat formulations could be utilized as clearcoats.

The following examples have been selected to illustrate specific embodiments and practices of advantage to a more complete understanding of the invention. Unless otherwise stated, "parts" means parts-by-weight and "percent" is percent-by-weight. The numeric ratings for solvent resistance (MEK rubs), wet adhesion, and salt spray are on a scale of 0–10, 10 best.

In each of the clearcoat/basecoat formulations described in Examples 25 through 34 the primer was G.B.P.® etching primer filler (2-component vinyl-butyral based primer commercially available from The Sherwin-Williams Company) and the basecoat was Acrylyd® acrylic enamel (a lacquer-like coating commercially available from The Sherwin-Williams Company). The primer, the basecoat and the clearcoat were applied to provide dry film thicknesses of 1.0, 1.0 and 2.0 mils respectively.

EXAMPLE 1

PREPARATION OF ANHYDRIDE-FUNCTIONAL POLYMER

A reaction vessel equipped with mechanical stirrer, reflux condenser, thermometer, nitrogen inlet and fluid metering pump was charged with 1472 parts xylene, 240 parts maleic anhydride and heated to reflux (139° C.) under nitrogen. A monomer mixture of 480 parts isobutyl methacrylate, 720 parts butyl acrylate, 720 parts methyl methacrylate, 120 parts maleic anhydride and 60 parts t-butyl perbenzoate were then metered into the reaction over a 3-hour period. Halfway through the addition, an additional 120 parts of maleic anhydride was charged to the reaction vessel and monomer addition is continued. After refluxing the reaction mixture for an additional 15 minutes, 12 parts of t-butyl perbenzoate in 128 parts xylene was added over 45 minutes. Heating was continued for 2 hours at reflux. The resulting xylene soluble anhydride-functional resin was 61.2% solids, had a Gardner Holdt viscosity of 24.5, an acid value of 116.5 and a density of approximately 8.6 pounds per gallon.

EXAMPLE 2

ANHYDRIDE-FUNCTIONAL ACRYLIC POLYMER

A reaction vessel equipped as in Example 1 was charged with 6,624 parts of xylene, 648 parts of maleic anhydride and heated to reflux under nitrogen. To this heated solution a monomer mixture of 5,616 parts butyl acrylate, 3,024 parts methylmethacrylate, 540 parts maleic anhydride and 270 parts of t-butyl peroctoate was metered into the reaction vessel at a constant rate over a 3-hour time period. At 1 hour and at 2 hours into the monomer addition, heating and monomer addition were stopped and the reactor was charged with 540 parts and 432 parts of maleic anhydride respectively. Heating was resumed to reflux and the monomer addition was continued. The reaction mixture was maintained at reflux temperature for an additional 15 minutes after the completion of all of the monomer addition. A solution of 54 parts of t-butyl peroctoate in 576 parts xylene was added to the reaction over a 45-minute period. The reaction was held at reflux for an additional 2 hours and then allowed to cool to room temperature to obtain an anhydride-functional polymer having a number average molecular weight of about 1,800 and a free maleic anhydride content of less than 0.1%. This polymer had an average of about 3.6 anhydride groups per molecule.

EXAMPLE 3

CARBOXYL-FUNCTIONAL ACRYLIC POLYMER carboxyl-functional acrylic polymer was prepared by charging a reaction vessel equipped with a mechanical stirrer, reflux condenser, thermometer, nitrogen inlet and fluid metering pump with 1621.2 parts xylene which was then heated to 120° C. under nitrogen. A monomer mixture comprising 1013.2 parts hydroxy ethyl acrylate, 1013.2 parts Tone M-100 (trade name of Union Carbide's hydroxy acrylic/caprolactone adduct believed to be the reaction product of 1 mole of hydroxy ethyl acrylate and 2 moles of caprolactone), 2837.2 parts methyl methacrylate, 3242.1 parts isobutyl methacrylate, 81.1 parts Vazo 67 (trademark for E.I. duPont initiator believed to be 2,2'-azobis(2-methylbutyronitrile)) and 6352.9 parts xylene was metered into the reaction vessel over a period of 3 hours while maintaining the temperature of the reaction vessel at 120° C. After the monomer addition was completed, the temperature of the reaction mixture was raised to reflux (137° C.) and 20.3 parts Vazo 67 in 131.4 parts xylene was added over a period of 30 minutes. Reflux temperature was maintained for one additional hour. After cooling the reaction mixture to room temperature, 1144.4 parts maleic anhydride and 1144.4 parts xylene were added. The polymeric solution was heated to 60° C. and 10.8 parts triethyl amine was added. The reaction mixture was stirred and maintained at 60° C. for approximately 6 hours. The resulting carboxylic acid-functional acrylic polymer had a theoretical percent solids of 48.1, a Gardner Holdt viscosity of V-, and an acid equivalent weight of 790.

EXAMPLE 4

A curable coating was prepared according to the following recipe:

| Raw Material | Parts |
| --- | --- |
| Acid-Functional Acrylic Resin of Example 3 | 411.85 |
| ERL 4221 (Union Carbide trade name for 3,4-epoxycyclohexylmethyl 3,4-epoxycyclohexane carboxylate) | 131.13 |
| 10% Triphenylphosphine/Toluene | 33.28 |
| Xylene | 74.58 |
| Anhydride-Functional Polymer of Example 1 | 151.54 |
| 10% N-methylimidazole/ Methyl Isobutyl Ketone | 32.65 |

This coating formulation represented approximately 1.5 epoxy groups per each theoretical acid group and the triphenylphosphine catalyst was present at approximately 1% on epoxy and carboxyl resin solids.

The coatings were applied directly to iron phosphate treated steel substrates and allowed to air dry. The coated films exhibited a Knoop hardness number of 14 after one day, 25 after two days, 36 after one week, and 71 after two weeks. The cured films had good solvent resistance, excellent resistance to humidity (170 hours) and to salt spray (170 hours).

EXAMPLE 5

A curable coating was prepared according to the following recipe:

| Raw Material | Parts |
| --- | --- |
| Acid-Functional Acrylic Resin of Example 3 | 409.08 |
| Anhydride-Functional Acrylic Polymer of Example 2 | 129.35 |
| ERL 4299 (Union Carbide Trade Name for bis(3,4-epoxycyclohexylmethyl)adipate) | 107.00 |
| Byk 300 (flow agent commercially available from Byk Mallinkrodt Chem. Produkte GmbH.) | 2.50 |
| Xylene | 49.78 |
| Methyl ethyl ketone | 100.20 |
| 20% N-methylimidazole in methyl isobutyl ketone | 19.55 |

This coating represents 3.3 epoxy groups and 1.6 carboxylic acid groups per each anhydride group. The N-methylimidazole catalyst is present at 1% based upon resin solids. The coatings were applied directly to iron phosphate treated cold rolled steel panels and allowed to air dry at room temperature for 24 hours. The coated films exhibited a Koenig Pendulum hardness number of 65 after 1 week and 113 after 4 weeks. Solvent resistance (MEK) was rated as a 9 after 1 week air dry. The films showed good humidity and salt spray resistance.

EXAMPLES 6–14

Coating formulations were prepared according to the recipe of Example 5 except that the levels of acid-functional resin, anhydride-functional resin, and epoxy-functional resin were varied as shown in the table below:

TABLE 1

| | Air Dry | | | | | | | | | |
| --- | --- | --- | --- | --- | --- | --- | --- | --- | --- | --- |
| Example | 6 | 7 | 8 | 9 | 10 | 11 | 12 | 13 | 14 | Comparative Examples Commercially Available Two-Component Urethane |
| Component Eq. | | | | | | | | | | |
| COOH | 0.1 | 1.0 | 9.9 | 0.1 | 1.0 | 0.8 | 0.5 | 0.3 | 0.3 | — |
| Epoxy | 1.5 | 1.0 | 14.8 | 1.2 | 2.7 | 2.0 | 1.8 | 1.6 | 1.3 | — |
| Anh | 1.0 | 1.0 | 1.0 | 1.0 | 1.0 | 1.0 | 1.0 | 1.0 | 1.0 | — |
| KPH | | | | | | | | | | |
| 1 week | 43 | 64 | 48 | 57 | 54 | 71 | 56 | 55 | 64 | 73 |
| 4 weeks | 104 | 109 | 60 | 110 | 106 | 105 | 102 | 107 | 115 | 99 |
| MEK (0–10, 10 Best) | | | | | | | | | | |
| 1 week | 8 | 5 | 9 | 6 | 8 | 5 | 4 | 8 | 5 | 10 |
| 4 weeks | 9 | 7 | 10 | 7 | 9 | 6 | 7 | 8 | 7 | 10 |
| Humidity | | | | | | | | | | |
| Init. 20° | 93 | 90 | 93 | 95 | 91 | 79 | 25 | 53 | 60 | 98 |
| Final 20° | 88 | 83 | 25 | 93 | 91 | 77 | 25 | 53 | 54 | 97 |
| % Retention | 95% | 92% | 27% | 98% | 100% | 97% | 100% | 100% | 90% | 99% |
| Salt Spray | | | | | | | | | | |
| Scribe Creep (mm) | 6 | 11 | 15 | 10 | 4 | 5 | 12 | 17 | 10 | 5 |
| Scribe Corrosion (1–10, 10 Best) | 2 | 0 | 4 | 0 | 8 | 2 | 0 | 0 | 0 | 5 |

EXAMPLES 15–24

Coating compositions as described in Examples 6–14 were spray applied to iron phosphate treated cold rolled steel panels and baked 30 minutes at 180° F. to give the performance described in Table 2 below:

TABLE 2

180° F./30-Minute Bake

| Example | 15 | 16 | 17 | 18 | 19 | 20 | 21 | 22 | 23 | 24 | Comparative Examples Commercially Available Two Component Urethane |
|---|---|---|---|---|---|---|---|---|---|---|---|
| Component Eq. | | | | | | | | | | | |
| COOH | 0.1 | 0.1 | 9.9 | 0.1 | 1.0 | 0.8 | 0.5 | 0.3 | 0.3 | 1.6 | — |
| Epoxy | 1.5 | 1.0 | 14.8 | 1.2 | 2.7 | 2.0 | 1.8 | 1.6 | 1.3 | 3.3 | — |
| Anh | 1.0 | 1.0 | 1.0 | 1.0 | 1.0 | 1.0 | 1.0 | 1.0 | 1.0 | 1.0 | — |
| KPH | | | | | | | | | | | |
| 1 week | 22 | 41 | 65 | 32 | 51 | 63 | 41 | 25 | 37 | 67 | 129 |
| 4 weeks | 80 | 100 | 72 | 88 | 90 | 104 | 72 | 71 | 71 | 101 | 135 |
| MEK (0–10, 10 Best) | | | | | | | | | | | |
| 1 week | 6 | 3 | 9 | 4 | 9 | 6 | 6 | 5 | 4 | 9 | 10 |
| 4 weeks | 6 | 7 | 9 | 6 | 10 | 8 | 8 | 8 | 7 | 9 | 10 |
| Humidity | | | | | | | | | | | |
| Init. 20° | 69 | 77 | 91 | 60 | 87 | 33 | 7 | 6 | 7 | 100 | 99 |
| Final 20° | 67 | 63 | 55 | 51 | 88 | 46 | 9 | 6 | 7 | 99 | 96 |
| % Retention | 97% | 82% | 60% | 85% | 101% | 117% | 78% | 100% | 100% | 99% | 97% |
| Wet Adhesion | 10 | 10 | 7 | 10 | 10 | 10 | 10 | 10 | 10 | 10 | 10 |
| (0–10, 10 Best) | | | | | | | | | | | |
| Salt Spray | | | | | | | | | | | |
| Scribe Creep (mm) | 7 | 20 | 13 | 10 | 9 | 15 | 19 | 16 | 10 | 9 | 2 |
| Scribe Corrosion | 2 | 0 | 5 | 0 | 8 | 0 | 0 | 0 | 0 | 5 | 5 |
| (0–10, 10 Best) | | | | | | | | | | | |

EXAMPLES 25–34

Clearcoat/basecoat systems were prepared utilizing the reactive coating of this invention as a clearcoat by reducing the clear coatings of this invention with suitable solvents and spray applying these coatings over a primer/basecoat system on iron phosphate treated cold rolled steel panels. The coating system was allowed to ambient cure at least 24 hours before testing. The results of testing are shown in Table 3 below:

TABLE 3

Clear Coat/Base Coat

| Example | 25 | 26 | 27 | 28 | 29 | 30 | 31 | 32 | 33 | 34 | Comparative Examples Commercially Available Two-Component Urethane |
|---|---|---|---|---|---|---|---|---|---|---|---|
| Component Eq. | | | | | | | | | | | |
| COOH | 0.1 | 0.1 | 9.9 | 0.1 | 1.0 | 0.8 | 0.5 | 0.3 | 0.3 | 1.6 | — |
| Epoxy | 1.5 | 1.0 | 14.8 | 1.2 | 2.7 | 2.0 | 1.8 | 1.6 | 1.3 | 3.3 | — |
| Anh | 1.0 | 1.0 | 1.0 | 1.0 | 1.0 | 1.0 | 1.0 | 1.0 | 1.0 | 1.0 | — |
| KPH | | | | | | | | | | | |
| 1 week | 28 | 36 | 15 | 35 | 22 | 22 | 25 | 40 | 42 | 29 | 28 |
| 4 weeks | 59 | 62 | 26 | 61 | 38 | 37 | 54 | 69 | 69 | 40 | 41 |
| MEK (0–10, 10 Best) | | | | | | | | | | | |
| 1 week | 3 | 2 | 3 | 2 | 6 | 6 | 6 | 3 | 3 | 3 | 10 |
| 4 weeks | 9 | 2 | 3 | 2 | 8 | 6 | 7 | 8 | 7 | 3 | 10 |
| Humidity | | | | | | | | | | | |
| Init. 20° | 80 | 76 | 80 | 70 | 78 | 72 | 38 | 55 | 62 | 80 | 83 |
| Final 20° | 73 | 62 | 53 | 67 | 70 | 50 | 33 | 47 | 36 | 73 | 81 |
| % Retention | 91% | 82% | 66% | 96% | 90% | 69% | 87% | 85% | 58% | 91% | 98% |
| Wet Adhesion | 8 | 9 | 0 | 10 | 2 | 5 | 5 | 8 | 7 | 5 | 8 |
| (0–10, 10 Best) | | | | | | | | | | | |
| Salt Spray | | | | | | | | | | | |
| Scribe Creep (mm) | | | | | | | | NONE | | | |
| Scribe Corrosion | 7 | 9 | 8 | 7 | 9 | 9 | 9.5 | 8 | 9 | 8 | 7 |
| (0–10, 10 Best) | | | | | | | | | | | |

The invention claimed is:

1. A curable composition consisting essentially of:
   (i) an acid-functional polymer obtained by the reaction of a hydroxy-functional polymer and at least one cyclic anhydride to form acid and ester groups, and having an average of at least two carboxylic acid groups per molecule; and
   (ii) an anhydride-functional component having an average of at least two cyclic carboxylic acid anhydride groups per molecule; and
   (iii) an epoxy-functional component having one epoxy group per molecule; wherein at least one of the components (i), (ii), or (iii) comprises a film forming polymer.

2. The composition of claim 1 further characterized in that the hydroxy-functional polymer comprises the addition polymerization reaction product of (a) 10 to about 40 weight percent of a hydroxy-functional ethylenically unsaturated monomer and (b) 60 to about 90 weight percent of at least one ethylenically unsaturated monomer copolymerizable with the hydroxy-functional monomer.

3. The composition of claim 2 further characterized in that the cyclic anhydride is maleic anhydride.

4. The composition of claim 1 further characterized in that the anhydride-functional component is an anhydride-functional polymer having a number average weight of at least about 500.

5. The composition of claim 4 further characterized in that the anhydride-functional polymer is the addition polymerization reaction product of at least one unsaturated monomer having anhydride functionality.

6. The composition of claim 5 further characterized in that the anhydride-functional polymer is the additon polymerization reaction product of (a) 5 to 40 weight percent of an ethylenically unsaturated monoanhydride and (b) 60 to 95 weight percent of at least one other ethylenically unsaturated monomer copolymerizable with the ethylenically unsaturated anhydride.

7. The composition of claim 6 further characterized in that the monoanhydride is maleic anhydride.

8. The composition of claim 1 further characterized in that it also incorporates a catalyst for the reaction of acid groups and epoxy groups.

9. The composition of claim 8 further characterized in that the catalyst is triphenyl phosphine.

10. The composition of claim 1 further characterized in that it also incorporates a catalyst for the reaction of anhydride and hydroxyl groups.

11. The composition of claim 10 further characterized in that the catalyst is a tertiary amine.

12. The composition of claim 11 further characterized in that the tertiary amine is N-methylimidazole.

13. The composition of claim 1 further characterized in that components (i), (ii), and (iii) are each present at a level to provide 0.3 to 6.0 acid groups and 0.6 to 12.0 epoxy groups for each anhydride group.

14. The composition of claim 13 further characterized in that components (i), (ii), and (iii) are each present at a level to provide 2.0 to 5.0 acid groups and 3.0 to 8.0 epoxy groups for each anhydride group.

15. A curable composition consisting essentially of:
   (i) an acid-functional polymer having an average of at least two carboxylic acid groups per molecule and wherein the polymer is obtained by the half-ester reaction of a hydroxy-functional polymer with a cyclic carboxylic acid anhydride; and
   (ii) an anhydride-functional polymer having an average of at least two cyclic carboxylic acid anhydride groups per molecule and wherein the anhydride-functional polymer is the addition polymerization reaction product of (a) 5 to about 40 weight percent of an ethylenically unsaturated monoanhydride and (b) 60 to about 95 weight percent of at least one other ethylenically unsaturated monomer copolymerizable with the ethylenically unsaturated anhydride; and
   (iii) an epoxy-functional component having one epoxy group per molecule.

16. The composition of claim 15 further characterized in that the hydroxy-functional polymer which is reacted with the cyclic carboxylic acid anhydride comprises the addition polymerization reaction product of (a) 10 to about 40 weight percent of a hydroxy-functional ethylenically unsaturated monomer and (b) 60 to about 90 weight percent of at least one ethylenically unsaturated monomer copolymerizable with the hydroxy-functional monomer.

17. The composition of claim 16 further characterized in that the cyclic carboxylic acid anhydride is maleic anhydride.

18. The composition of claim 17 further characterized in that the anhydride-functional compound is an anhydride-functional polymer having a number average weight of at least about 500.

19. The composition of claim 15 further characterized in that the anhydride-functional polymer is the additon polymerization reaction product of (a) 5 to 40 weight percent of an ethylenically unsaturated monoanhydride and (b) 60 to 95 weight percent of at least one other ethylenically unsaturated monomer copolymerizable with the ethylenically unsaturated anhydride.

20. The composition of claim 19 further characterized in that the monoanhydride is maleic anhydride.

21. The composition of claim 15 further characterized in that it also incorporates a catalyst for the reaction of acid groups and epoxy groups.

22. The composition of claim 21 further characterized in that the catalyst is triphenyl phosphine.

23. The composition of claim 15 further characterized in that it also incorporates a catalyst for the reaction of anhydride and hydroxyl groups.

24. The composition of claim 23 further characterized in that the catalyst is a tertiary amine.

25. The composition of claim 24 further characterized in that the tertiary amine is N-methylimidazole.

26. The composition of claim 15 further characterized in that components (i), (ii), and (iii) are each present at a level to provide 0.3 to 6.0 acid groups and 0.6 to 12.0 epoxy groups for each anhydride group.

27. The composition of claim 26 further characterized in that components (i), (ii), and (iii) are each present at a level to provide 2.0 to 5.0 acid groups and 3.0 to 8.0 epoxy groups for each anhydride group.

* * * * *